United States Patent
Anderson et al.

(10) Patent No.: US 11,010,295 B2
(45) Date of Patent: *May 18, 2021

(54) ASYNCHRONOUS UPDATE OF METADATA TRACKS IN RESPONSE TO A CACHE HIT GENERATED VIA AN I/O OPERATION OVER A BUS INTERFACE

(71) Applicant: International Business Machines Corporation, Armonk, NY (US)

(72) Inventors: Kyler A. Anderson, Sahuarita, AZ (US); Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,861

(22) Filed: Jan. 15, 2020

(65) Prior Publication Data
US 2020/0151095 A1    May 14, 2020

Related U.S. Application Data

(63) Continuation of application No. 15/695,920, filed on Sep. 5, 2017, now Pat. No. 10,565,109.

(51) Int. Cl.
*G06F 12/0804* (2016.01)
*G06F 13/20* (2006.01)
*G06F 13/16* (2006.01)

(52) U.S. Cl.
CPC ...... *G06F 12/0804* (2013.01); *G06F 13/1673* (2013.01); *G06F 13/20* (2013.01);
(Continued)

(58) Field of Classification Search
CPC ...... G06F 12/00; G06F 12/06; G06F 12/0804; G06F 12/0895; G06F 13/1673; G06F 13/20; G06F 2212/1016; G06F 2212/1032
See application file for complete search history.

(56) References Cited

U.S. PATENT DOCUMENTS

| | | | | |
|---|---|---|---|---|
| 4,845,710 A | ‡ | 7/1989 | Nakamura | H04J 3/02 370/110 |
| 5,493,668 A | ‡ | 2/1996 | Elko | G06F 12/02 395/457 |

(Continued)

FOREIGN PATENT DOCUMENTS

| CN | 101236530 | ‡ | 8/2008 |
|---|---|---|---|
| CN | 101236530 A | | 8/2008 |

(Continued)

OTHER PUBLICATIONS

English Translation for CN104035729, published Sep. 10, 2014, Total 28 pages.‡

(Continued)

*Primary Examiner* — Larry T Mackall
(74) *Attorney, Agent, or Firm* — Konrad Raynes Davda & Victor LLP; Rabindranath Dutta

(57) ABSTRACT

A cache hit is generated, in response to receiving an input/output (I/O) command over a bus interface. An update for a metadata track is stored in a buffer associated with a central processing unit (CPU) that processes the I/O command, in response to generating the cache hit. The metadata track is asynchronously updated from the buffer with the stored update for the metadata track in the buffer.

20 Claims, 11 Drawing Sheets

(52) U.S. Cl.
CPC ............... *G06F 2212/1016* (2013.01); *G06F 2212/1032* (2013.01)

(56) References Cited

U.S. PATENT DOCUMENTS

| | | | | |
|---|---|---|---|---|
| 5,734,861 | A ‡ | 3/1998 | Cohn | G06F 12/12 395/461 |
| 5,848,241 | A ‡ | 12/1998 | Misinai | G06F 13/00 395/200.43 |
| 5,893,140 | A ‡ | 4/1999 | Vahalia | G06F 12/00 711/118 |
| 6,490,652 | B1 ‡ | 12/2002 | Van Hook | G06F 12/00 711/118 |
| 6,574,720 | B1 ‡ | 6/2003 | Hopeman | G06F 12/08 711/170 |
| 6,658,533 | B1 ‡ | 12/2003 | Bogin | G06F 12/00 711/135 |
| 6,944,724 | B2 ‡ | 9/2005 | Chaudhry | G06F 12/00 711/154 |
| 7,039,661 | B1 ‡ | 5/2006 | Ranade | G06F 17/30 707/204 |
| 7,620,057 | B1 ‡ | 11/2009 | Aloni | H04L 12/28 370/395.7 |
| 7,797,396 | B2 ‡ | 9/2010 | Barber | G06F 15/13 709/223 |
| 9,280,467 | B1 ‡ | 3/2016 | Kanteti | G06F 12/0808 |
| 9,384,143 | B1 ‡ | 7/2016 | Ash | G06F 12/00 12/95 |
| 9,460,177 | B1 ‡ | 10/2016 | Pawar | G06F 16/1865 |
| 9,588,895 | B2 ‡ | 3/2017 | Salyers | G06F 12/0804 |
| 9,880,933 | B1 ‡ | 1/2018 | Gupta | G06F 12/0815 12/815 |
| 10,082,958 | B2 ‡ | 9/2018 | Ash | G06F 3/0605 3/605 |
| 10,565,109 | B2 | 2/2020 | Anderson et al. | |
| 2002/0056030 | A1 ‡ | 5/2002 | Kelly | G06F 12/00 711/150 |
| 2005/0111353 | A1 ‡ | 5/2005 | Zievers | H04L 1/00 370/229 |
| 2005/0132252 | A1 ‡ | 6/2005 | Fifer | G06F 11/00 714/15 |
| 2007/0168565 | A1 ‡ | 7/2007 | Yuhara | G06F 3/00 710/1 |
| 2007/0245099 | A1 * | 10/2007 | Gray | G06F 9/3004 711/156 |
| 2008/0244153 | A1 ‡ | 10/2008 | Huang | G06F 12/0859 711/3 |
| 2009/0138659 | A1 ‡ | 5/2009 | Lauterbach | G06F 12/08 711/119 |
| 2010/0235569 | A1 ‡ | 9/2010 | Nishimoto | G06F 12/06 711/103 |
| 2012/0254507 | A1 ‡ | 10/2012 | Chang | G06F 12/02 711/103 |
| 2014/0344526 | A1 ‡ | 11/2014 | Brown | G06F 12/0815 711/141 |
| 2015/0088805 | A1 ‡ | 3/2015 | Kakarla | G06F 17/3048 |
| 2015/0134709 | A1 ‡ | 5/2015 | Lee | G06F 17/30336 |
| 2016/0170885 | A1 ‡ | 6/2016 | Salyers | G06F 12/0813 12/813 |
| 2016/0232102 | A1 ‡ | 8/2016 | Ash | G06F 12/0891 12/891 |
| 2016/0378818 | A1 ‡ | 12/2016 | Marcotte | G06F 16/2379 707/70 |
| 2017/0052897 | A1 ‡ | 2/2017 | Ash | G06F 12/0891 12/891 |
| 2017/0115931 | A1 ‡ | 4/2017 | Markiewicz | G06F 3/0659 3/659 |
| 2017/0124000 | A1 ‡ | 5/2017 | Ash | G06F 12/128 12/128 |
| 2017/0124001 | A1 ‡ | 5/2017 | Ash | G06F 12/128 12/128 |
| 2017/0344493 | A1 ‡ | 11/2017 | Ash | G06F 12/122 12/122 |
| 2017/0351611 | A1 ‡ | 12/2017 | Ash | G06F 12/0817 12/817 |
| 2019/0034355 | A1 ‡ | 1/2019 | Anderson | G06F 12/128 |
| 2019/0042115 | A1 ‡ | 2/2019 | Anderson | G06F 3/0622 |
| 2019/0073301 | A1 | 3/2019 | Anderson et al. | |

FOREIGN PATENT DOCUMENTS

| | | | |
|---|---|---|---|
| CN | 104035729 | ‡ | 9/2014 |
| CN | 104035729 | A | 9/2014 |
| CN | 106850856 | ‡ | 6/2017 |
| CN | 106850856 | A | 6/2017 |

OTHER PUBLICATIONS

English Translation for CN106850856, published Jun. 13, 2017, Total 8 pages.‡

English Translation for CN101236530, published Aug. 6, 2008, Total 15 pages.‡

International Search Report and Written Opinion, dated Jan. 4, 2019, for International Application No. PCT/ IB2018/ 056423, Total 9 pages.‡

Yang et al., "When Poll is Better than Interrupt", USENIX, Feb. 2012, p. 1-2. (Year: 2012).‡

Ganger et al, Metadata Update Performance in File Systems, USENIX Symposium on Operating Systems Design and Implementation, Nov. 1994, pp. 49-60. (Year: 1994).‡

Ganger et al., Soft Updates: A Solution to the Metadata Update Problem in File Systems, ACM Transactions on Computer Systems, May 2000, pp. 127-153. (Year: 2000).‡

Do et al, Turbocharging DBMS Buffer Pool Using SSDs, SIGMOD, Jun. 2011, pp. 1113-1124. (Year: 2011).‡

Beckmann et al., LHD: Improving Cache Hit Rate by Maximizing Hit Density, Apr. 2018, USENIX Symposium on Networked Systems Design and Implementation, pp. 389-403. (Year: 2018).‡

International Search Report and Written Opinion, dated Jan. 4, 2019, for International Application No. PCT/ IB2018/ 0356423, Total 9 pages.

Ganger et al., "Metadata update Performace in File Systems", USENIX Symposium on Operating Systems Design and Implementation, Nov. 1994, pp. 49-60.

Ganger et al., "Soft Updates: A Solution to the MetadataUpdate Problem in File Systems", ACM Transactions on Computer Systems, May 2000, pp. 127-153.

Do et al., "TurbochargingDBMSBuffer PoolUsings SSDs SIGMOD", SIGMOD, Jun. 2011, pp. 1113-1124.

Beckman et al., "LHD: Improving Cahe HitRate by Maximizing Hit Density", Apr. 2018, USENIX Symposium on Networked Systems Design and Implementation, pp. 389-403.

Yang, et al., "When Poll is Better than Interrupt", USENIX, Feb. 2012, pp. 2.

List of IBM Patents and Applications Treated as Related, pp. 2, Jan. 23, 2020.

GB Examination Report dated May 22, 2020, pp. 2, for Application IGB2004608.2.

GB Reply to Examination Report dated Jul. 20, 2020, pp. 6, for Application IGB2004608.2.

U.S. Appl. No. 15/695,920, filed Sep. 5, 2017.

Office Action dated Nov. 16, 2018, 26 pp., for U.S. Appl. No. 15/695,920.

Response to Office Action dated Feb. 19, 2019, 16 pp., for U.S. Appl. No. 15/695,920.

Final Office Action dated Jun. 10, 2019, 22 pages, for U.S. Appl. No. 15/695,920.

Response to Final Office Action dated Sep. 10, 2019, 12 pp., for U.S. Appl. No. 15/695,920.

Notice of Allowance dated Oct. 9, 2019, 9 pp., for U.S. Appl. No. 15/695,920.

DE Office Action dated Feb. 4, 2021, pp. 4, for SN DE112018004138.7.

Response dated Feb. 11, 2021, pp. 2, to DE Office Action dated Feb. 4, 2021, pp. 4, for SN DE112018004138.7.

(56) References Cited

OTHER PUBLICATIONS

DE112018004138.7_Description_clean_copy, dated Feb. 11, 2021, pp. 21.
DE112018004138.7_Description_marked_up, dated Feb. 11, 2021, pp. 22.
DE112018004138.7_Claims_clean_copy, dated Feb. 11, 2021, pp. 8.
DE112018004138.7_Claims_marked_up, dated Feb. 11, 2021, pp. 8.

\* cited by examiner
‡ imported from a related application

ASYNCHRONOUS UPDATE OF METADATA TRACKS IN RESPONSE TO A CACHE HIT GENERATED VIA AN I/O OPERATION OVER A BUS INTERFACE

CROSS-REFERENCE TO RELATED APPLICATION

This application is a continuation of U.S. patent application Ser. No. 15/695,920, filed Sep. 5, 2017, which application is incorporated herein by reference in its entirety.

BACKGROUND

1. Field

Embodiments relate to the asynchronous update of metadata tracks in response to a cache hit generated via an I/O operation over a bus interface.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts. In certain situations, the storage servers of the storage controller may each include a plurality of central processing units (CPU) that may be used to perform parallel execution of a plurality of tasks.

The storage controller may include a cache. Data written from a host may be stored in the cache and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

SUMMARY OF THE PREFERRED EMBODIMENTS

Provided are a method, a system, a storage controller, and a computer program product in which a cache hit is generated, in response to receiving an input/output (I/O) command over a bus interface. An update for a metadata track is stored in a buffer associated with a central processing unit (CPU) that processes the I/O command, in response to generating the cache hit. The metadata track is asynchronously updated from the buffer with the stored update for the metadata track in the buffer. As a result, the I/O command is able to complete in a timely manner without waiting for the update to the metadata track.

In additional embodiments, the processing of the I/O command by the CPU is completed prior to asynchronously updating the metadata track from the buffer with the stored update for the metadata track in the buffer. As a result, the I/O command may complete in a timely manner, prior to the corresponding update to the metadata track being made.

In further embodiments, the buffer is a free buffer reserved for the CPU from a buffer pool. In response to the buffer being filled up with updates for metadata tracks by the CPU, the buffer is returned to the buffer pool. An indication is made to indicate that the buffer returned to the buffer pool is a used buffer. As a result, the used buffer may temporarily store updates for metadata tracks.

In certain embodiments, a background task of a plurality of background tasks performs operations for asynchronously updating the metadata track. As a result, updates to metadata tracks are made by tasks that execute in the background and does not hinder the processing of syncio operations.

In further embodiments, an indication is made to indicate that the used buffer is a free buffer, in response to asynchronously updating the metadata track from the used buffer with the stored update for the metadata track in the used buffer. As a result, used buffers are freed in a buffer pool and may be reused, when metadata updates have been completed from the used buffers.

In certain embodiments, a plurality of CPUs process a plurality of I/O commands over a plurality of bus interfaces. An adjustment is made of the number of the plurality of background tasks to maintain an adequate number of free buffers in the buffer pool, where the adequate number of free buffers in the buffer pool is greater than a first threshold number and fewer than a second threshold number. As a result, the number of free buffers and used buffers are kept in balance in the buffer pool.

In further embodiments, a plurality of an adjustable number of background tasks asynchronously updates a plurality of metadata tracks from a plurality of buffers with stored updates for the plurality of metadata tracks, where the stored updates for the plurality of metadata tracks in the plurality of buffers are generated by a plurality of CPUs. As a result of the background tasks being adjustable in number, the number of free buffers and used buffers are kept in balance in a buffer pool.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt.

The code path for syncio needs to be extremely optimized to satisfy the time requirements for completion of syncio operations. Any condition that may delay the completion of a syncio operation may cause the storage controller to indicate to a host that the syncio operation cannot be completed, and the syncio operation may have to be retried from the host.

A syncio operation may cause a cache hit that may cause updates to be needed for one or metadata tracks, where a metadata track may store information regarding a plurality of tracks stored in the cache. For example, a metadata track may store information (metadata) regarding a thousand tracks stored in the cache. Direct update of the one or more metadata tracks may not be possible within the time period in which the syncio operation must complete, because a plurality of CPUs that may be performing syncio operations may need to write to the same metadata track and must take turns for writing to the same metadata track. Additionally, some of the metadata tracks may be on a disk storage device and it may not be possible to update such metadata tracks within the time period in which the syncio operation must complete.

Certain embodiments, update a plurality of buffers associated with a plurality of CPUs with the information (metadata) that is to be written to metadata tracks, when cache hits occur during syncio operations performed by the plurality of CPUs. The updates to the buffers associated with the CPUs can be completed within the time periods in which the syncio operations need to complete. Background tasks may update the metadata tracks with the metadata written to the buffers. Therefore, the update of the metadata tracks is performed asynchronously with the syncio operations, i.e., the update to a metadata track corresponding to a track need not be performed while a syncio operation performs an I/O operation on the track.

Exemplary Embodiments

Figure 1:
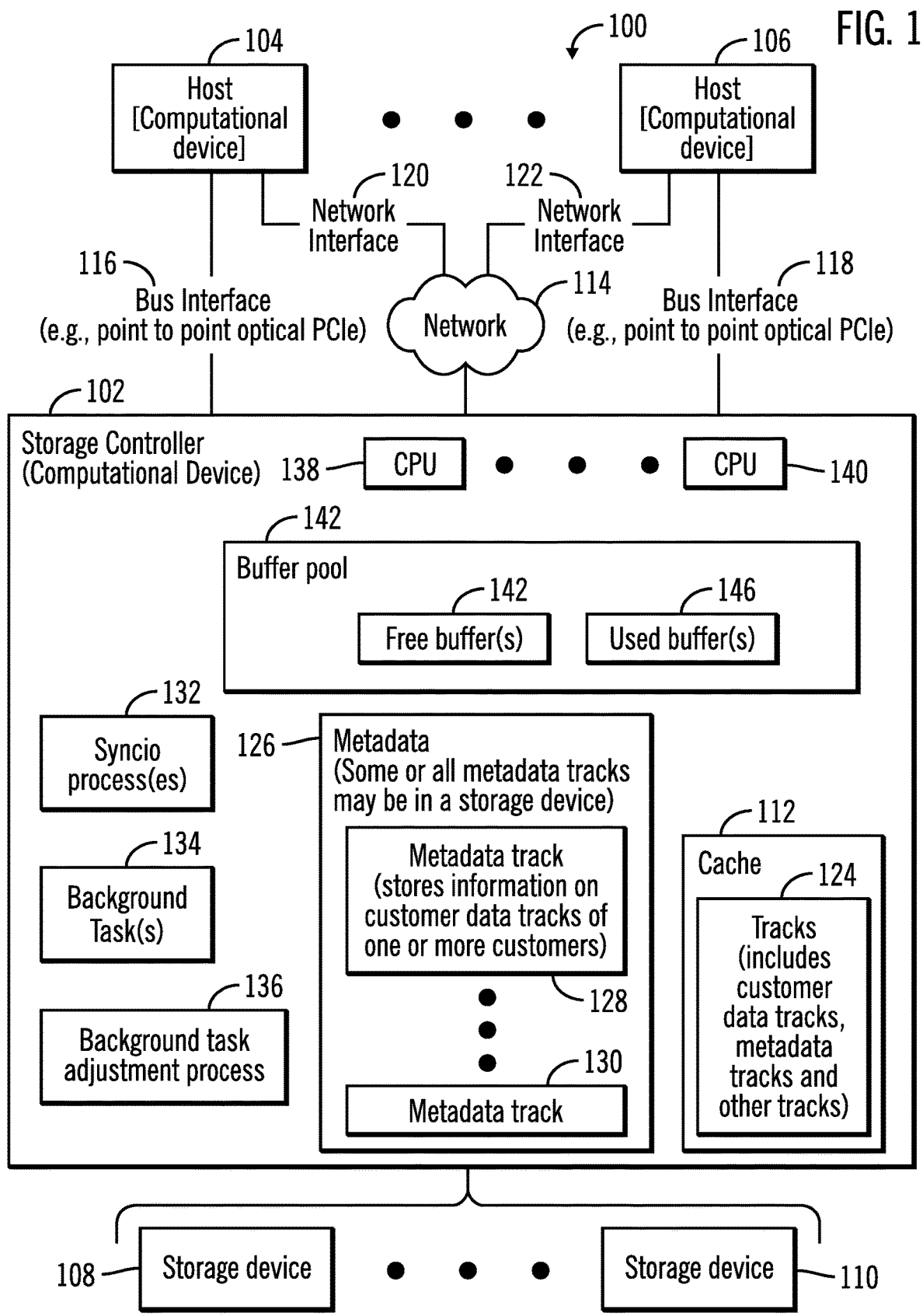
FIG. 1 illustrates a block diagram of a computing environment comprising a storage controller coupled to one or more hosts and one or more storage devices for integrating syncio processing with cache and metadata management, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 and/or a cache 112 (e.g., a memory) of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network 114, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, the hosts 104, 106 may be coupled to the storage controller 102 via a bus interface (e.g., a point to point optical PCIe interface) 116, 118 and a network interface 120, 122. Syncio operations from the hosts 104, 106 may be performed over the bus interfaces 116, 118. Traditional I/O operations from the hosts 104, 106 may be performed over the network interfaces 120, 122. The bus interfaces 116, 118 may comprise a faster access channel for I/O than the network interfaces 120, 122. Additional bus interface technology to extend the bus interface 116, 118 may be utilized, including PCIe extender cables or components, such as a distributed PCIe switch, to allow PCIe over Ethernet, such as with the ExpEther technology.

The cache 112 may store a plurality of tracks 124 that include customer data tracks, metadata tracks, and other tracks. Metadata tracks may also be stored in the storage devices 108, 110. Each of the metadata tracks may store information on one or more customer data tracks. Therefore, metadata 126 for a plurality of customer data tracks is stored in a plurality of metadata tracks 128, 130 where each metadata track stores information on customer data tracks of one or more customers and some or all of the metadata tracks 128, 130 may be present in the cache 112 and some of all of the metadata tracks 128. 130 may be present in one or more of the storage devices 108, 110.

The storage controller 102 executes one or more syncio processes 132, one or more background tasks 134, and a background task adjustment process 136. The syncio processes 132 may execute on a plurality of CPUs 138, 140 of the storage controller. A buffer pool 142 comprising one or more free buffers 144 and one or more used buffers 146 are maintained in the storage controller 102, where each of the buffers 144, 146 in the buffer pool 142 comprises memory that may be associated with a CPU of the plurality of CPUs 138, 140.

In certain embodiments, a CPU 138 may perform a syncio operation and because of cache hits to a track of the cache 112, the CPU 138 updates a previously reserved buffer selected from the free buffers 144 with information that needs to be written to metadata track 128 corresponding to the track of the cache 112. The background task 134 may update the metadata tracks 128, 130 asynchronously with the performing of syncio operations, by copying information written to a plurality of buffers by a plurality of CPUs 138, 140 during the syncio operations, to the metadata tracks (i.e., a syncio operation can complete before a metadata track is updated). A background task adjustment process 136 adjusts the number of background tasks to ensure that there is an adequate number of free buffers 144 that may be reserved by the CPUs 138, 140 to temporarily write the information that is ultimately to be written to the metadata tracks 128, 130.

Figure 2:
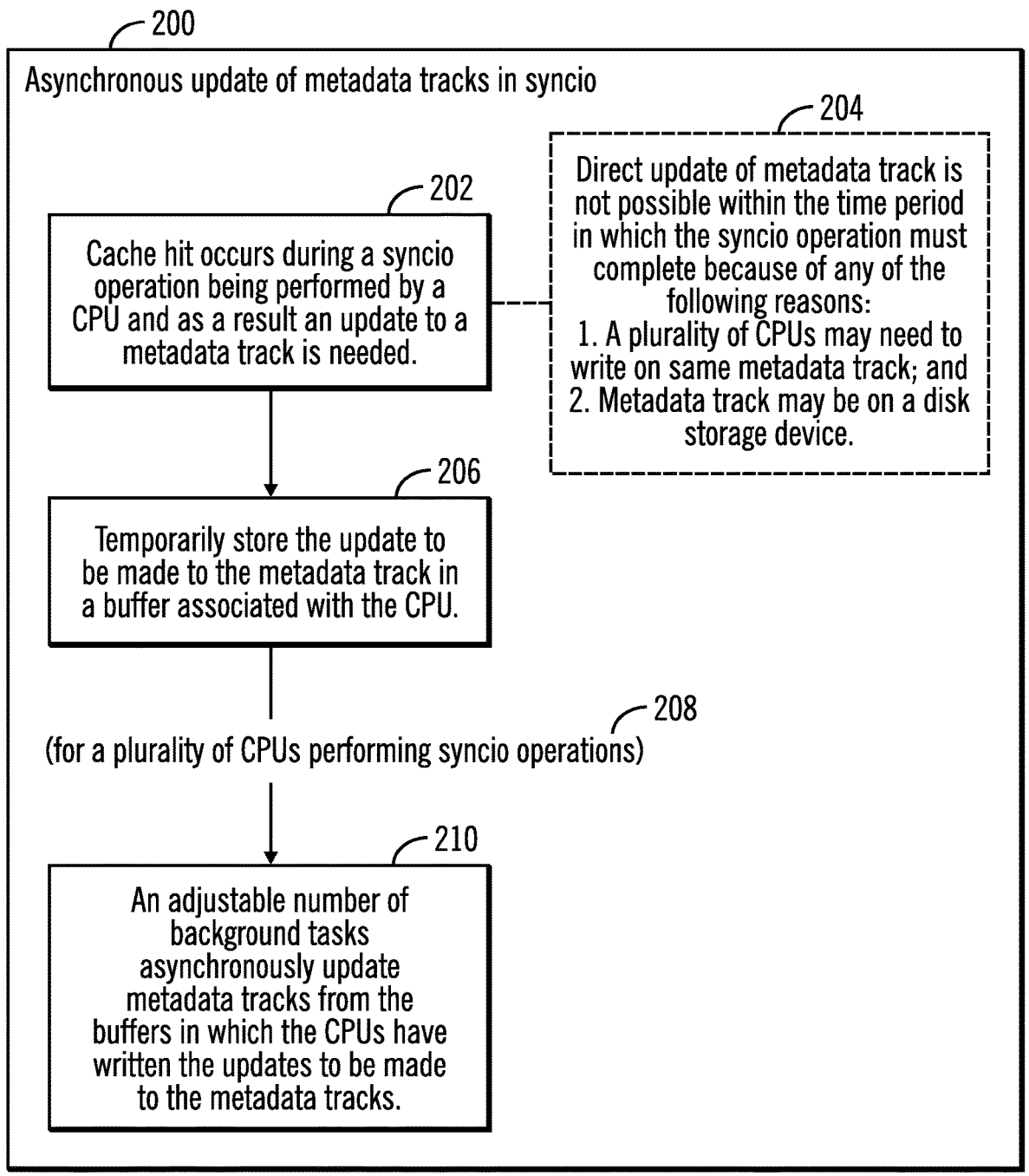
FIG. 2 illustrates a block diagram that shows the asynchronous update of metadata tracks in syncio, in accordance with certain embodiments.

FIG. 2 illustrates a block diagram 200 that shows the asynchronous update of metadata tracks in syncio, in accordance with certain embodiments. In certain embodiments, the operations shown in FIG. 2 may be performed by the storage controller 102.

Control starts at block 202 in which a cache hit on the cache 112 occurs during a syncio operation being performed by a CPU 138, and as a result an update to a metadata track 128 is needed. Direct update of metadata track 128 is not possible within the time period in which the syncio operation must complete because of any of the following reasons: (1) A plurality of CPUs 138, 140 may need to write on same metadata track 128 and the metadata track 128 may be already be locked for writing by another CPU besides the CPU 138; and (2) The metadata track 128 may be on a disk storage device and the time to write directly to the metadata track 128 or to write to a staged copy of the metadata track 128 exceeds the time within which the syncio operation is required to complete (as shown in block 204).

From block 202 control proceeds to block 206 in which the CPU 138 temporarily stores the update to be made to the metadata track in a buffer associated with the CPU 138. Additionally for a plurality of CPUs 138, 140 performing syncio operations (as shown via reference numeral 208) an adjustable number of background tasks 134 asynchronously update (at block 210) metadata tracks 128, 130 from the buffers in which the CPUs 138, 140 have written the updates to be made to the metadata tracks 128, 130.

Figure 3:
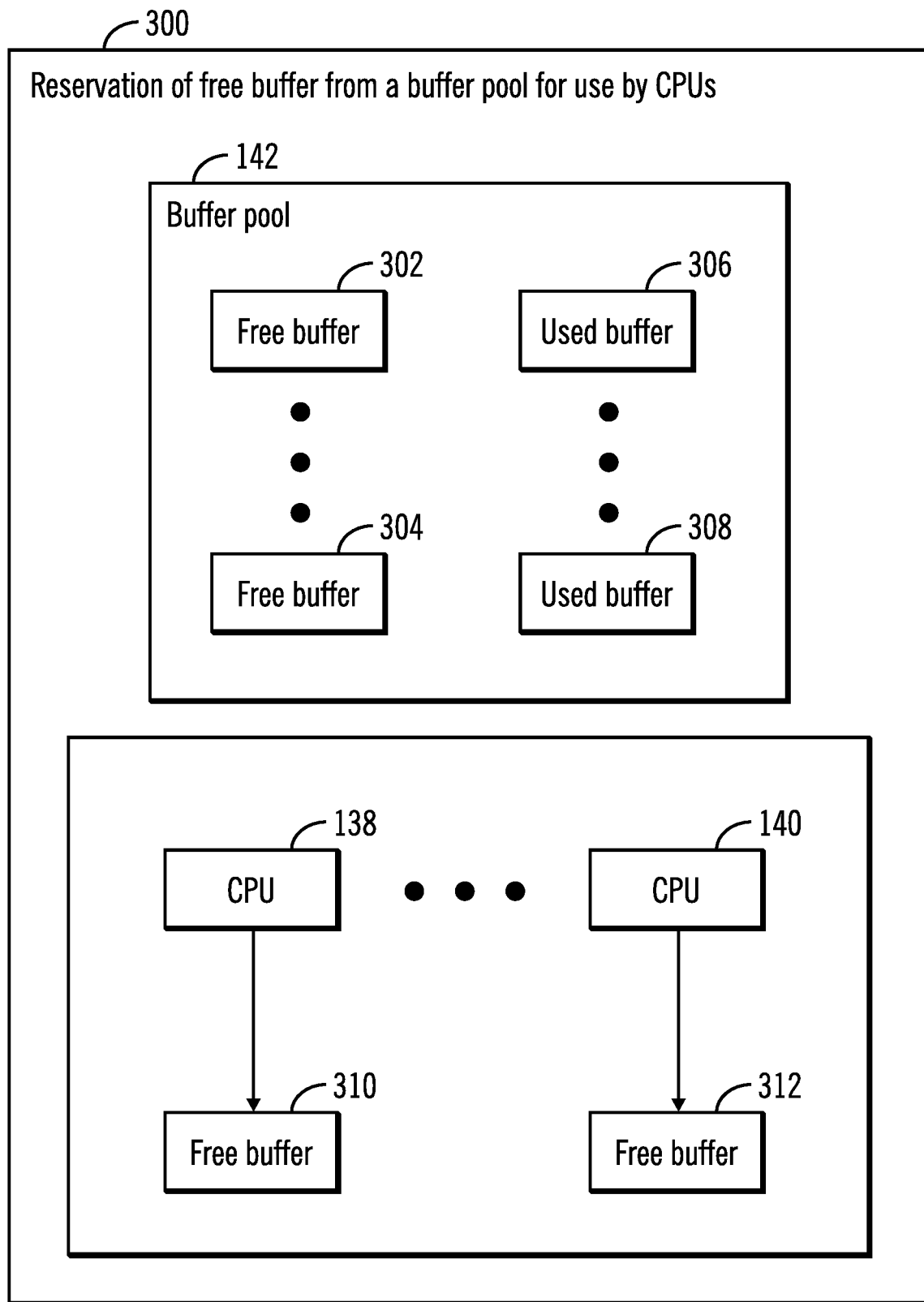
FIG. 3 illustrates a block diagram that shows the reservation of free buffers from a buffer pool by CPUs, in accordance with certain embodiments.

FIG. 3 illustrates a block diagram 300 that shows the reservation of free buffers from a buffer pool 142 by CPUs 138, 140, in accordance with certain embodiments.

The buffer pool 142 may include a plurality of free buffers 302, 304 and a plurality of used buffers 306, 308. A free buffer is a buffer which is empty, i.e., the memory comprising the buffer may be written into without any data loss. A used buffer is a buffer that is full, i.e., more data may not be written to the memory comprising the buffer without overwriting already existing data that is needed by the storage controller 102.

In certain embodiments, when a CPU needs to update a metadata track and the CPU does not have any assigned buffer for exclusive writing by the CPU, the CPU reserves a free buffer of the buffer pool 142 and assigns the reserved free buffer for exclusive writing by the CPU. For example, in FIG. 3, CPU 138 has assigned itself the free buffer 310, and CPU 140 has assigned itself the free buffer 312. Since a buffer is a memory included in the storage controller 102, a CPU may write updates to a buffer that is reserved for the CPU much faster than to a metadata track, because the metadata track may be locked by another CPU or may be residing in a storage device.

Figure 4:
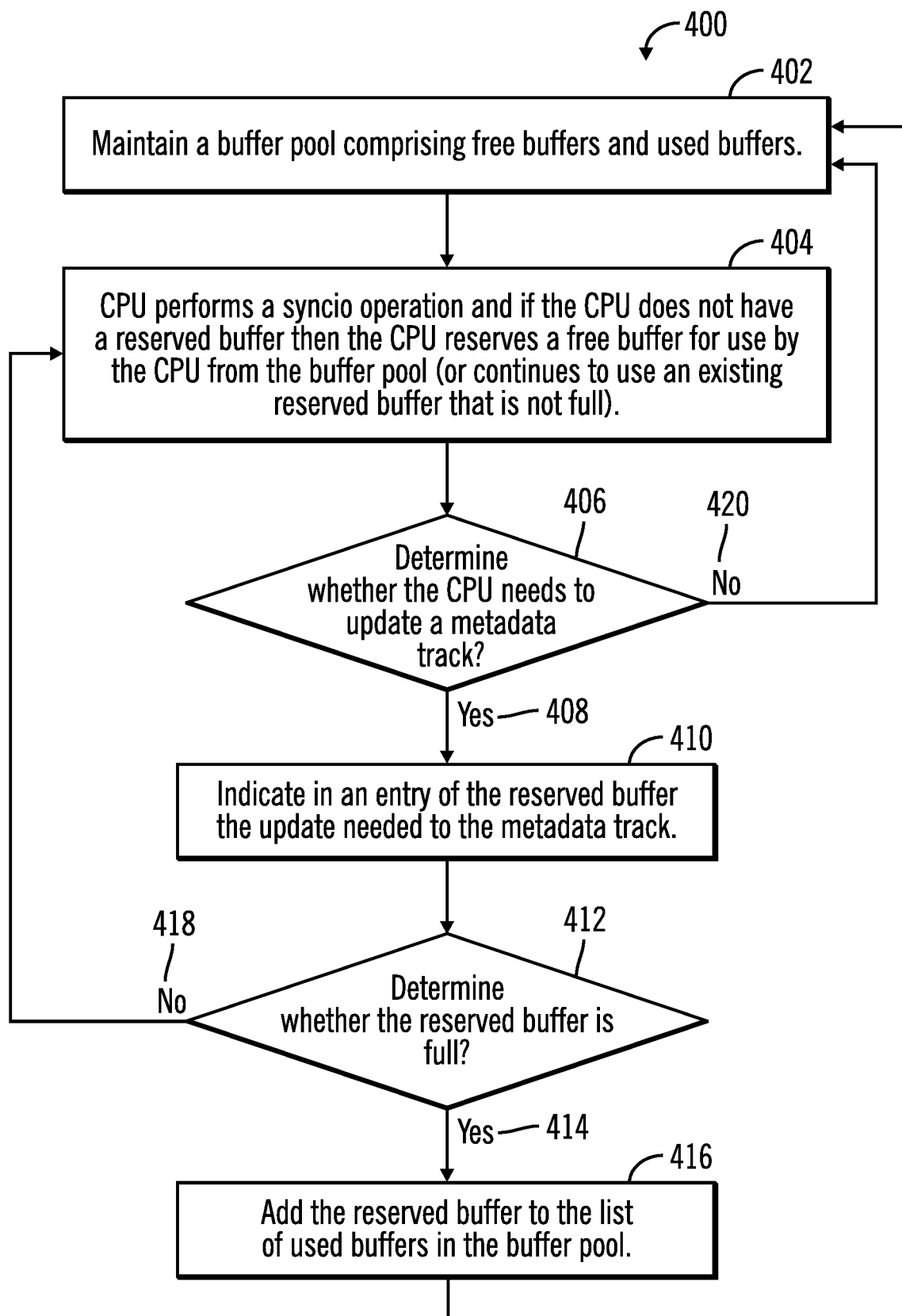
FIG. 4 illustrates a flowchart that shows operations for managing the buffer pool, in accordance with certain embodiments.

FIG. 4 illustrates a flowchart 400 that shows operations for managing the buffer pool 142, in accordance with certain embodiments. In certain embodiments, the operations shown in FIG. 4 may be performed by the storage controller 102.

Control starts at block 402 in which the storage controller 102 maintains a buffer pool 142 comprising free buffers 144 and used buffers 146. A CPU 138 performs a syncio operation and if the CPU 138 does not have a reserved buffer then the CPU 138 reserves a free buffer for use by the CPU 138 from the buffer pool 142 (at block 404). If at block 404, the CPU 138 already has an existing reserved buffer that is not full, then the CPU 138 continues to the existing reserved buffer that is not full.

From block 404 control proceeds to block 406 in which a determination is made as to whether the CPU 138 needs to update a metadata track. For example, a metadata track may need to be updated if there is a read hit in the cache 112 while performing the syncio operation, where a metadata track may need to get updated to store statistics for determining what destage mechanisms to use to destage tracks from the cache 112.

If at block 406 it is determined that the CPU 138 needs to update a metadata track ("Yes" branch 408), then control proceeds to block 410 in which the CPU 138 indicates (at block 410) in an entry of the reserved buffer the update needed to the metadata track. Control proceeds to block 412, in which the CPU 138 determines whether the reserved buffer is full. If so, ("Yes" branch 414) then the CPU 138 adds (at block 416) the reserved buffer to a list of used buffers in the buffer pool 142, and control returns to block 402. If not ("No" branch 418), control returns to block 404 where the CPU 138 continues to use the existing reserved buffer that is not full.

If at block 406 it is determined that the CPU 138 does not need to update a metadata track ("No" branch 420), then control returns to block 402.

Therefore FIG. 4 illustrates how the buffer pool 142 is managed to provide free buffers, and how used buffers are generated and placed in the buffer pool 142.

Figure 5:
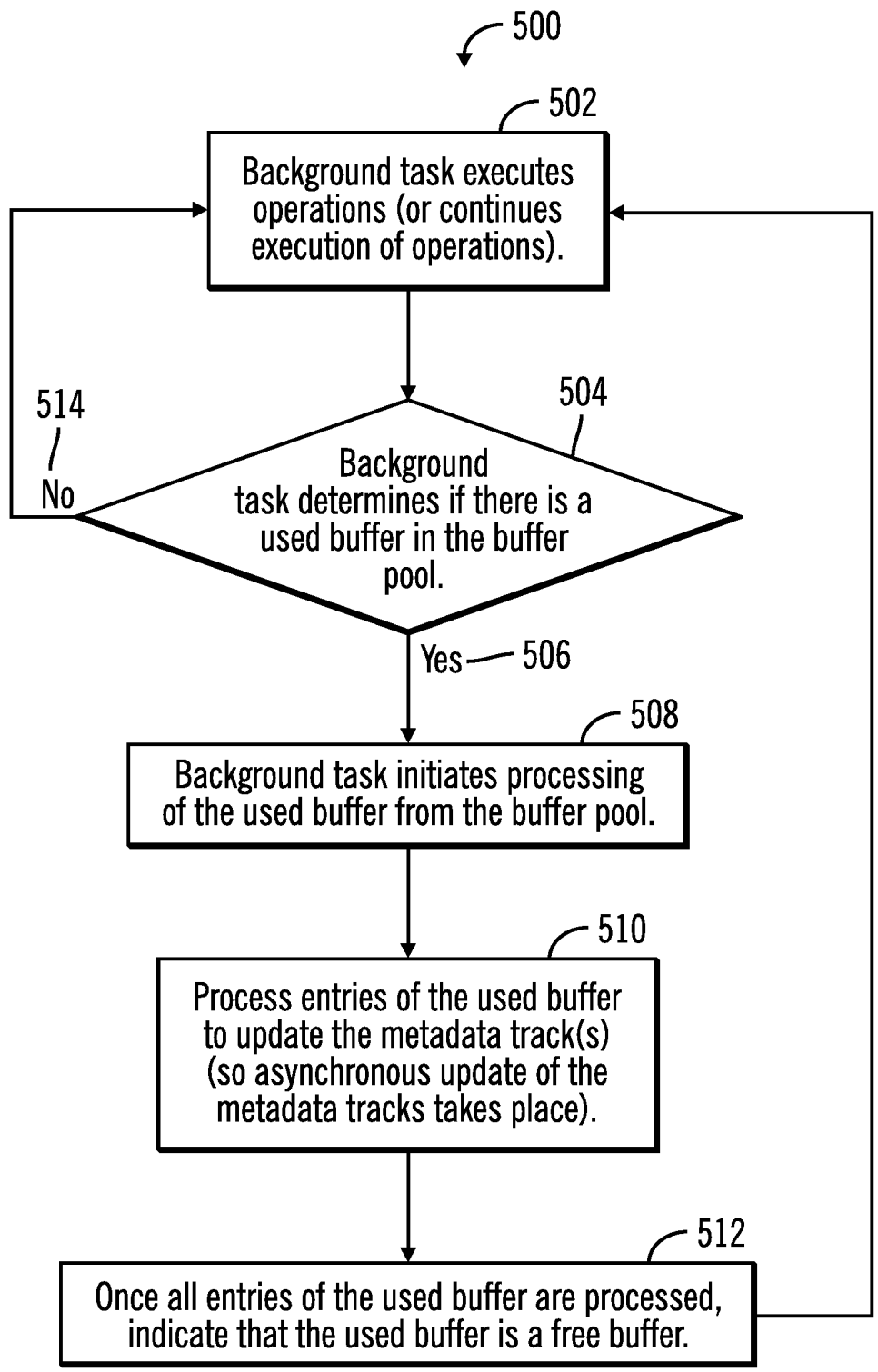
FIG. 5 illustrates a flowchart that shows how a background task asynchronously updates metadata tracks, in accordance with certain embodiments.

FIG. 5 illustrates a flowchart 500 that shows how a background task asynchronously updates metadata tracks, in accordance with certain embodiments. In certain embodiments, the operations shown in FIG. 5 may be performed within the storage controller 102 by one or more background tasks 134 that execute in the storage controller 102.

Control starts at block 502 in which the background task 134 starts executing operations or continues to execute operations. The background task 134 determines (at block 504) if there is a used buffer in the buffer pool 142. If so, ("Yes" branch 506) then the background task 134 initiates processing (at block 508) of the used buffer from the buffer pool 142. The background task 134 processes entries of the used buffer to update (at block 510) one or more metadata tracks 128, 130. Therefore, asynchronous update of the metadata tracks 128, 130 takes place. Once all entries of the used buffer are processed, the background task 134 indicates (at block 512) that the used buffer is a free buffer and control returns to block 502.

If at block 504, the background task 134 determines (at block 504) that there is no used buffer in the buffer pool 142 ("No" branch 514) then control returns to block 502.

Therefore, the operations shown in FIG. 5 show mechanisms to asynchronously update metadata tracks, i.e., the update of metadata tracks is asynchronous with respect to syncio operations.

Figure 6:
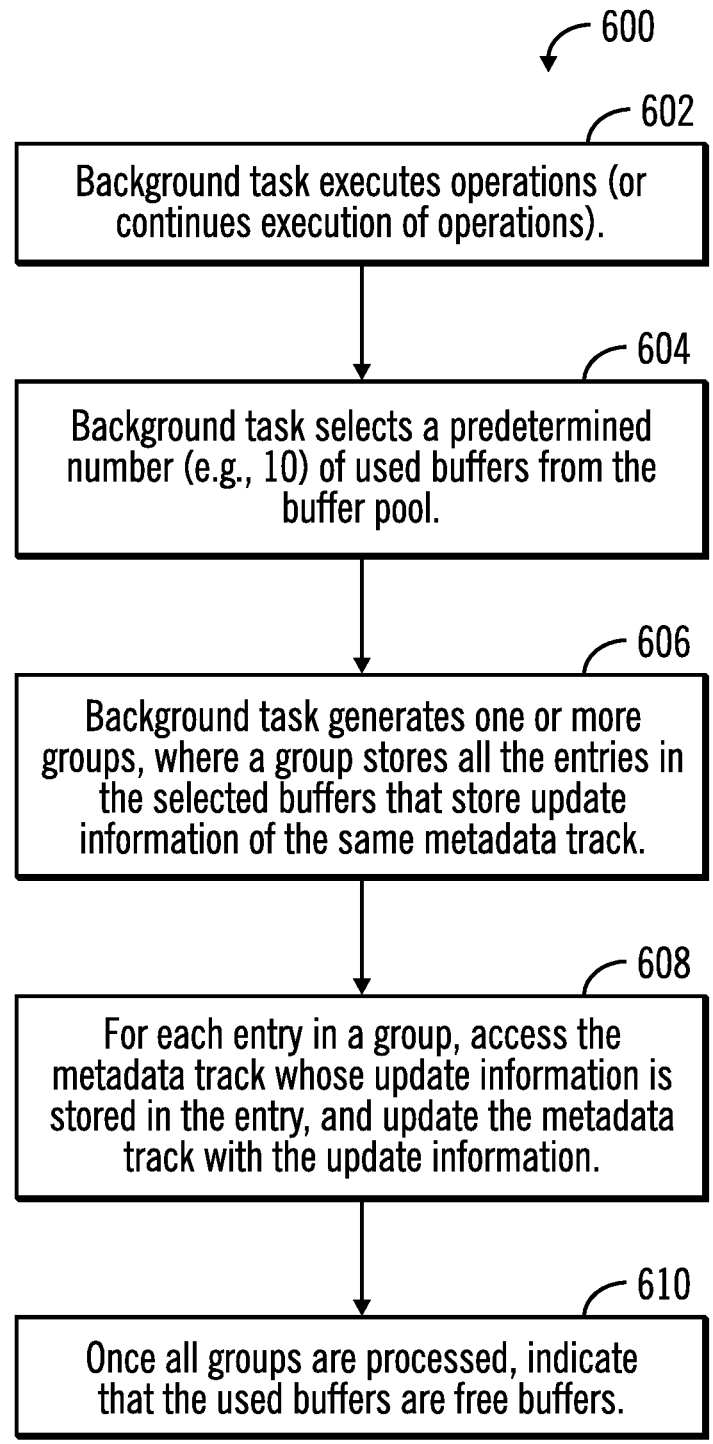
FIG. 6 illustrates another flowchart that shows how a background task asynchronously updates metadata tracks, in accordance with certain embodiments.

FIG. 6 illustrates another flowchart 600 that shows how a background task 134 asynchronously updates metadata tracks 128, 130, in accordance with certain embodiments. In certain embodiments, the operations shown in FIG. 6 may be performed within the storage controller 102 by one or more background tasks that execute in the storage controller 102.

Control starts at block 602 in which the background task 134 starts executing operations or continues to execute operations. The background task 134 selects (at block 604) a predetermined number (e.g., 10) of used buffers from the buffer pool 142. Control proceeds to block 606, in which the background task 134 generates one or more groups, wherein a group stores all the entries in the selected buffers that store update information of the same metadata track. For each entry in a group, the background task 134 accesses the metadata track whose update information is stored in the entry and updates (at block 608) the metadata track with the update, i.e., each entry of a group is used to update the same metadata track. The one or more groups generated in block 606 are processed in block 608.

From block 608, control proceeds to block 610, in which once all groups are processed, the used buffers selected by the background task in block 604 are indicated to be free buffers in the buffer pool 142.

Therefore, FIG. 6 illustrates mechanisms for converting a plurality of used buffers into free buffers in the buffer pool 142.

Figure 7:
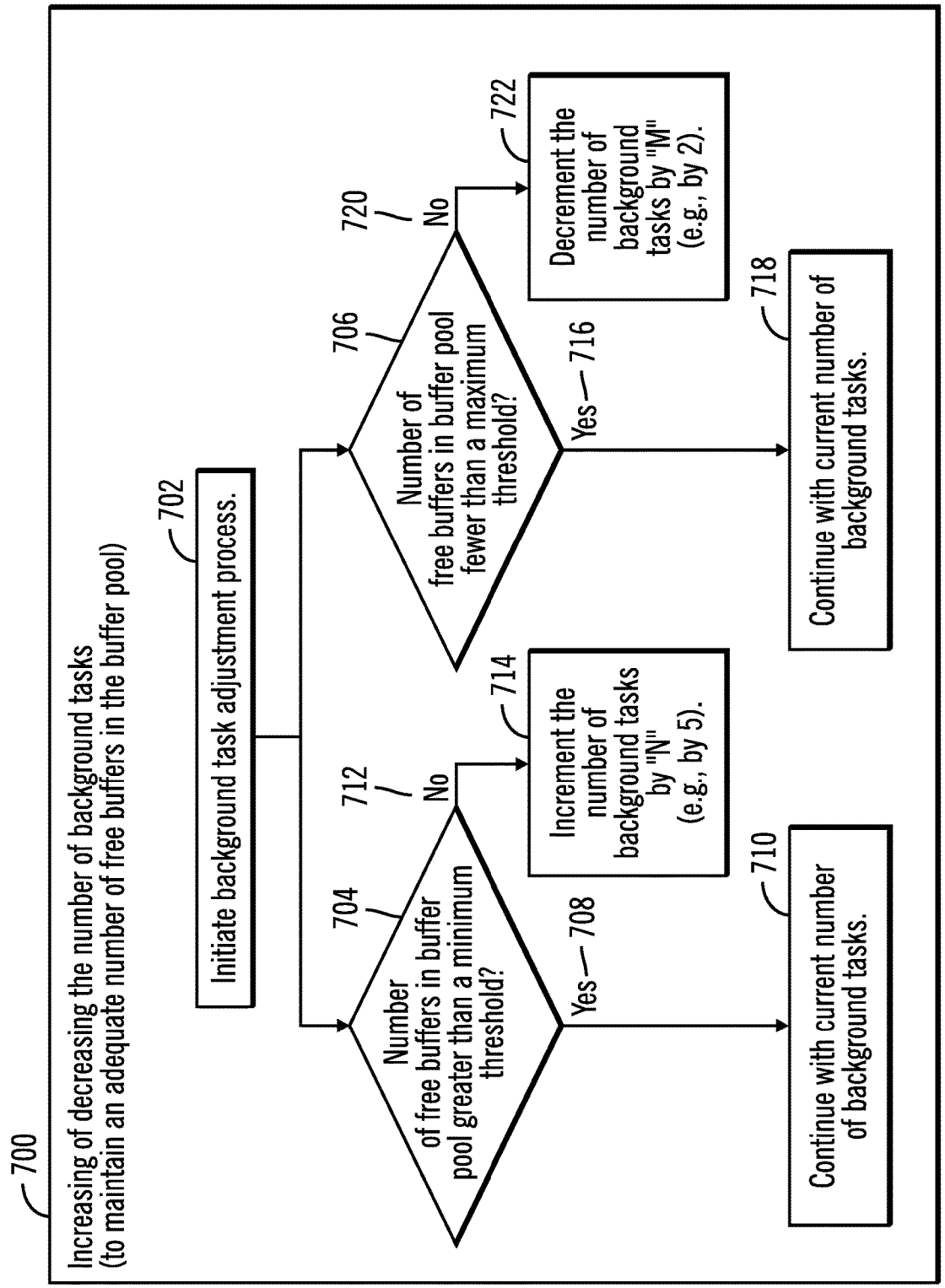
FIG. 7 illustrates a flowchart that shows how the number of background tasks is adjusted to maintain an adequate number of free buffers in the buffer pool, in accordance with certain embodiments.

FIG. 7 illustrates a flowchart 700 that shows how the number of background tasks is adjusted to maintain an adequate number of free buffers in the buffer pool 142, in accordance with certain embodiments. The operations shown in FIG. 7 may be performed by the background task adjustment process 136 that executes in the storage controller 102.

Control starts at block 702 in which the background task adjustment process 136 is initiated. From block 702 control proceeds in parallel to blocks 704 and 706.

At block 702, the background task adjustment process 136 determines if the number of free buffers in the buffer pool 142 is greater than a minimum threshold (e.g., 20). If so, ("Yes" branch 708) control proceeds to block 710 in which the background task adjustment process 136 continues to maintain the current number of background tasks. If not ("No" branch 712), then the background task adjustment process 136 increments (at block 714) the number of background tasks by "N" (e.g., if "N" represents the number 5, then the number of background tasks is increased by 5). Thus more background tasks are used to increase the rate at which used buffers are converted to free buffers, if the number of free buffers reach or fall below a minimum threshold.

At block 706, the background task adjustment process 136 determines if the number of free buffers in the buffer pool 142 is fewer than a maximum threshold (e.g., 30). If so, ("Yes" branch 716) control proceeds to block 718 in which the background task adjustment process 136 continues to maintain the current number of background tasks. If not, ("No" branch 720) then the background task adjustment process 136 decrements (at block 722) the number of background tasks by "M" (e.g., if "M" represents the number 2, then the number of background tasks is decreased by 2). Thus fewer background tasks are used to decrease the rate at which used buffers are converted to free buffers, if the number of free buffers reach or rise above a maximum threshold.

Therefore, FIG. 7 illustrates certain embodiments to maintain a suitable number of free buffers between a minimum threshold number and a maximum threshold number, by adjusting the number of background tasks that are used to convert used buffers into free buffers.

Figure 8:
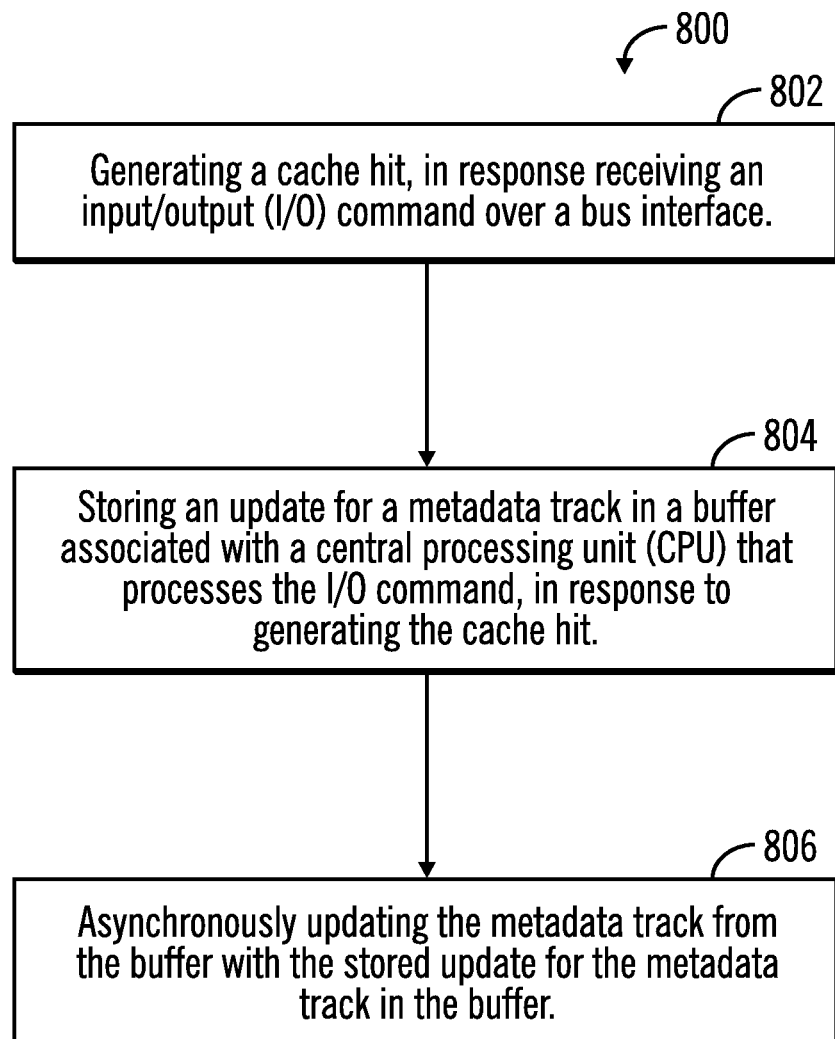
FIG. 8 illustrates a flowchart that shows how asynchronous updates of metadata tracks are made in response to a cache hit generated because of a syncio operation, in accordance with certain embodiments.

FIG. 8 illustrates a flowchart 800 that shows how asynchronous updates of metadata tracks are made in response to a cache hit generated because of a syncio operation, in accordance with certain embodiments. In certain embodiments, the operations shown in FIG. 8 may be performed by the storage controller 102.

Control starts at block 802 in which a cache hit is generated, in response to receiving an input/output (I/O) command over a bus interface 116, 118. The I/O command over the bus interface 116, 118 is a syncio command. An update for a metadata track is stored (at block 804) in a buffer associated with a central processing unit (CPU) 138 that processes the I/O command, in response to generating the cache hit.

From block 804, control proceeds to block 806 in which the metadata track is asynchronously updated (i.e., the syncio operation may have already completed at the time the metadata track is updated) from the buffer with the stored update for the metadata track in the buffer.

Therefore, FIGS. 1-8 illustrate certain embodiments in which the processing of a syncio command by a CPU generates the need for an update of a metadata track because of a cache hit. However, the syncio command is allowed to complete without waiting for the update to the metadata track. The CPU stores the update to the metadata track in a buffer reserved exclusively for the CPU, prior to completion of the processing of the syncio command. A background task copies the update from the buffer to the metadata track at an opportune time. As a result, syncio operations may complete in a timely manner without waiting for update to metadata tracks.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
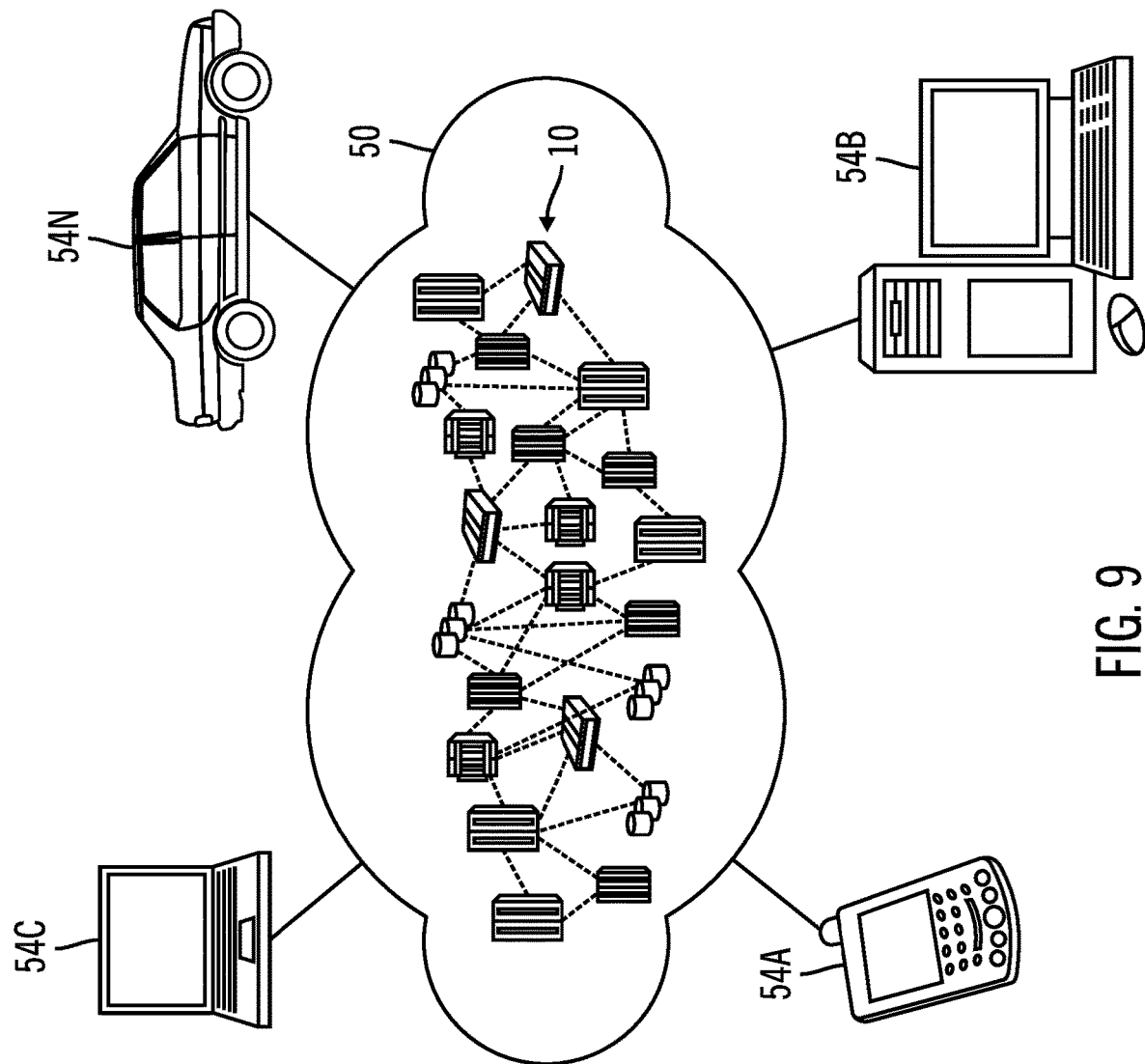
FIG. 9 illustrates a block diagram of a cloud computing environment, in accordance with certain embodiments.

Referring now to FIG. 9 a cloud computing environment 50 of certain embodiments is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that cloud computing nodes 10 and cloud computing environment 50 can communicate with any type of computerized device over any type of network and/or network addressable connection (e.g., using a web browser).

Figure 10:
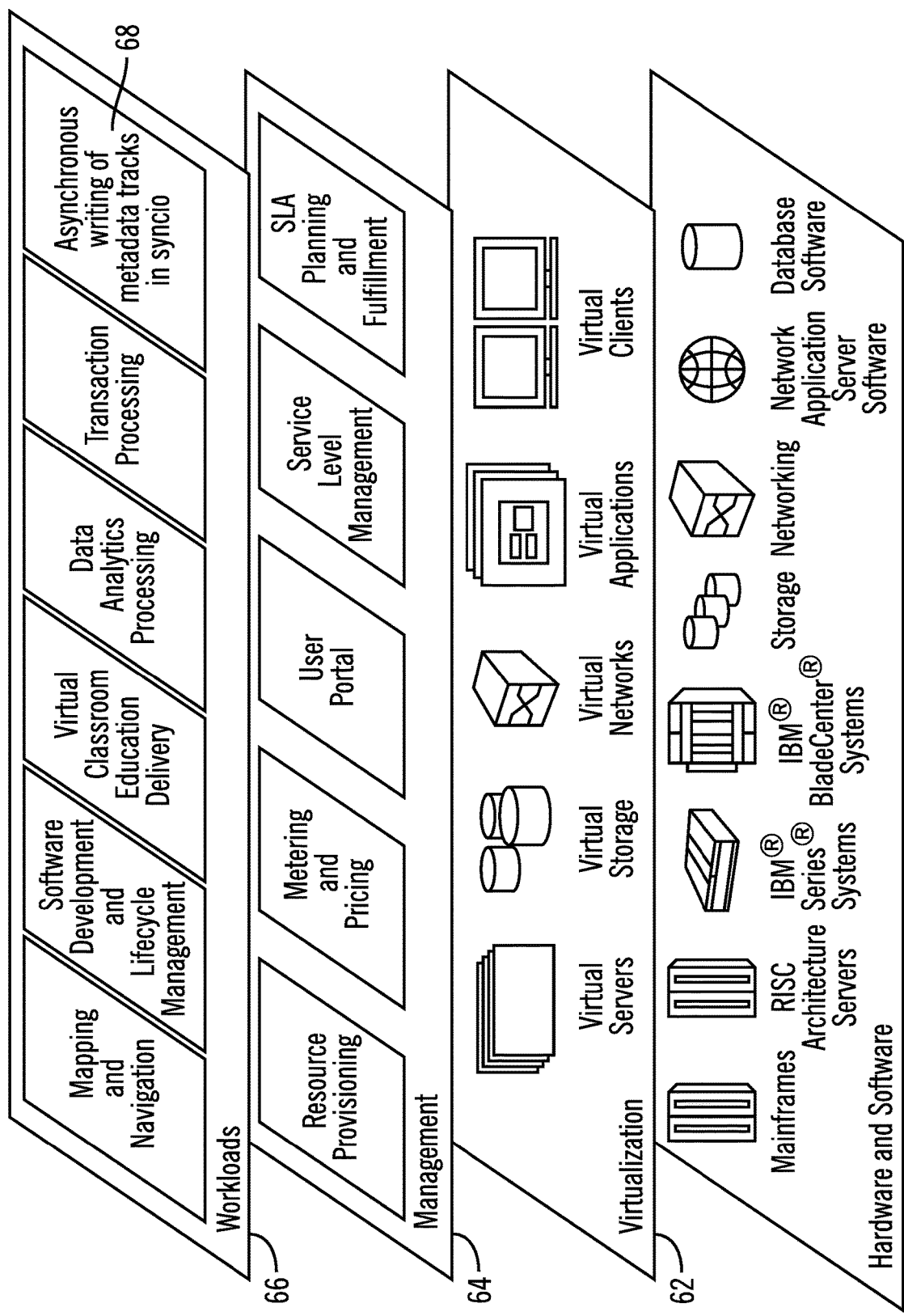
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and asynchronous writing of metadata track in syncio 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
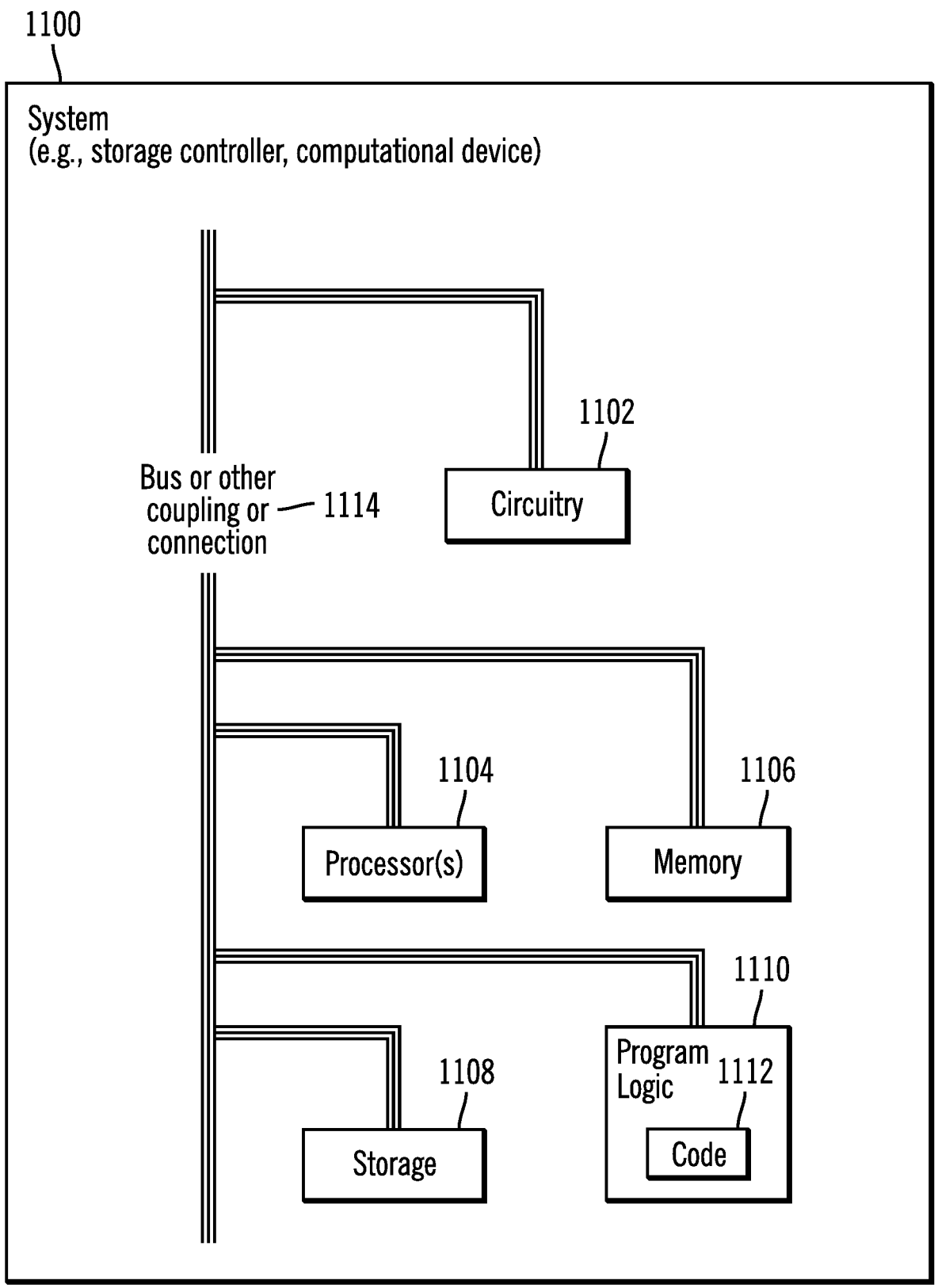
FIG. 11 illustrates a block diagram of a computational system that shows certain elements that may be included in the storage controller or the host, as described in FIGS. 1-10, in accordance with certain embodiments.

FIG. 11 illustrates a block diagram that shows certain elements that may be included in the storage controller 102, the hosts 104,106, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   generating a cache hit, in response to receiving an input/output (I/O) over a bus interface via a syncio process in which an application thread is held in a spin loop waiting for the I/O command to complete for a designated period of time, wherein the syncio process is performed by a central processing unit (CPU); and
   storing an update, for a metadata track maintained in a disk, in a buffer associated with the CPU that processes the I/O command, in response to generating the cache hit, wherein the designated period of time for which the syncio process performed by the CPU that processes the I/O command is held in the spin loop waiting for the I/O command to complete is insufficient for direct update of the metadata track, in response to the metadata track being locked for writing by another CPU besides the CPU that processes the I/O command.

2. The method of claim 1, wherein processing of the I/O command by the CPU is completed prior to asynchronously updating the metadata track from the buffer with the stored update for the metadata track in the buffer.

3. The method of claim 2, wherein the buffer is a free buffer reserved for the CPU from a buffer pool, the method further comprising:
   in response to the buffer being filled up with updates for metadata tracks by the CPU, returning the buffer to the buffer pool; and
   indicating that the buffer returned to the buffer pool is a used buffer.

4. The method of claim 3, wherein a background task of a plurality of background tasks performs operations for asynchronously updating the metadata track.

5. The method of claim 4, the method further comprising:
   indicating that the used buffer is a free buffer, in response to asynchronously updating the metadata track from the used buffer with the stored update for the metadata track in the used buffer.

6. The method of claim 5, wherein a plurality of CPUs process a plurality of I/O commands over a plurality of bus interfaces, the method further comprising:
   adjusting a number of the plurality of background tasks to maintain an adequate number of free buffers in the buffer pool, wherein the adequate number of free buffers in the buffer pool is greater than a first threshold number and fewer than a second threshold number.

7. The method of claim 1, wherein a plurality of an adjustable number of background tasks asynchronously updates a plurality of metadata tracks from a plurality of buffers with stored updates for the plurality of metadata tracks, wherein the stored updates for the plurality of metadata tracks in the plurality of buffers are generated by a plurality of CPUs.

8. A system, comprising:
   one or more central processing units (CPUs); and
   a computer readable storage medium having program instructions embodied therewith, the program instructions executable by the one or more CPUs to cause the one or more CPUs to perform operations, the operations comprising:
   generating a cache hit, in response to receiving an input/output (I/O) over a bus interface via a syncio process in which an application thread is held in a spin loop waiting for the I/O command to complete for a designated period of time, wherein the syncio process is performed by a central processing unit (CPU); and
   storing an update, for a metadata track maintained in a disk, in a buffer associated with the CPU that processes the I/O command, in response to generating the cache hit, wherein the designated period of time for which the syncio process performed by the CPU that processes the I/O command is held in the spin loop waiting for the I/O command to complete is insufficient for direct update of the metadata track, in response to the metadata track being locked for writing by another CPU besides the CPU that processes the I/O command.

9. The system of claim 8, wherein processing of the I/O command by the CPU is completed prior to asynchronously updating the metadata track from the buffer with the stored update for the metadata track in the buffer.

10. The system of claim 9, wherein the buffer is a free buffer reserved for the CPU from a buffer pool, the operations further comprising:
    in response to the buffer being filled up with updates for metadata tracks by the CPU, returning the buffer to the buffer pool; and
    indicating that the buffer returned to the buffer pool is a used buffer.

11. The system of claim 10, wherein a background task of a plurality of background tasks performs operations for asynchronously updating the metadata track.

12. The system of claim 11, the operations further comprising:
    indicating that the used buffer is a free buffer, in response to asynchronously updating the metadata track from the used buffer with the stored update for the metadata track in the used buffer.

13. The system of claim 12, wherein a plurality of CPUs process a plurality of I/O commands over a plurality of bus interfaces, the operations further comprising:

adjusting a number of the plurality of background tasks to maintain an adequate number of free buffers in the buffer pool, wherein the adequate number of free buffers in the buffer pool is greater than a first threshold number and fewer than a second threshold number.

14. The system of claim 8, wherein a plurality of an adjustable number of background tasks asynchronously updates a plurality of metadata tracks from a plurality of buffers with stored updates for the plurality of metadata tracks, wherein the stored updates for the plurality of metadata tracks in the plurality of buffers are generated by a plurality of CPUs.

15. A computer program product, the computer program product comprising a computer readable storage medium having computer readable program code embodied therewith, the computer readable program code configured to perform operations, the operations comprising:
   generating a cache hit, in response to receiving an input/output (I/O) over a bus interface via a syncio process in which an application thread is held in a spin loop waiting for the I/O command to complete for a designated period of time, wherein the syncio process is performed by a central processing unit (CPU); and
   storing an update, for a metadata track maintained in a disk, in a buffer associated with the CPU that processes the I/O command, in response to generating the cache hit, wherein the designated period of time for which the syncio process performed by the CPU that processes the I/O command is held in the spin loop waiting for the I/O command to complete is insufficient for direct update of the metadata track, in response to the metadata track being locked for writing by another CPU besides the CPU that processes the I/O command.

16. The computer program product of claim 15, wherein processing of the I/O command by the CPU is completed prior to asynchronously updating the metadata track from the buffer with the stored update for the metadata track in the buffer.

17. The computer program product of claim 16, wherein the buffer is a free buffer reserved for the CPU from a buffer pool, the operations further comprising:
   in response to the buffer being filled up with updates for metadata tracks by the CPU, returning the buffer to the buffer pool; and
   indicating that the buffer returned to the buffer pool is a used buffer.

18. The computer program product of claim 17, wherein a background task of a plurality of background tasks performs operations for asynchronously updating the metadata track.

19. The computer program product of claim 18, the operations further comprising:
   indicating that the used buffer is a free buffer, in response to asynchronously updating the metadata track from the used buffer with the stored update for the metadata track in the used buffer.

20. The computer program product of claim 19, wherein a plurality of CPUs process a plurality of I/O commands over a plurality of bus interfaces, the operations further comprising:
   adjusting a number of the plurality of background tasks to maintain an adequate number of free buffers in the buffer pool, wherein the adequate number of free buffers in the buffer pool is greater than a first threshold number and fewer than a second threshold number.

\* \* \* \* \*